Patented Nov. 24, 1953

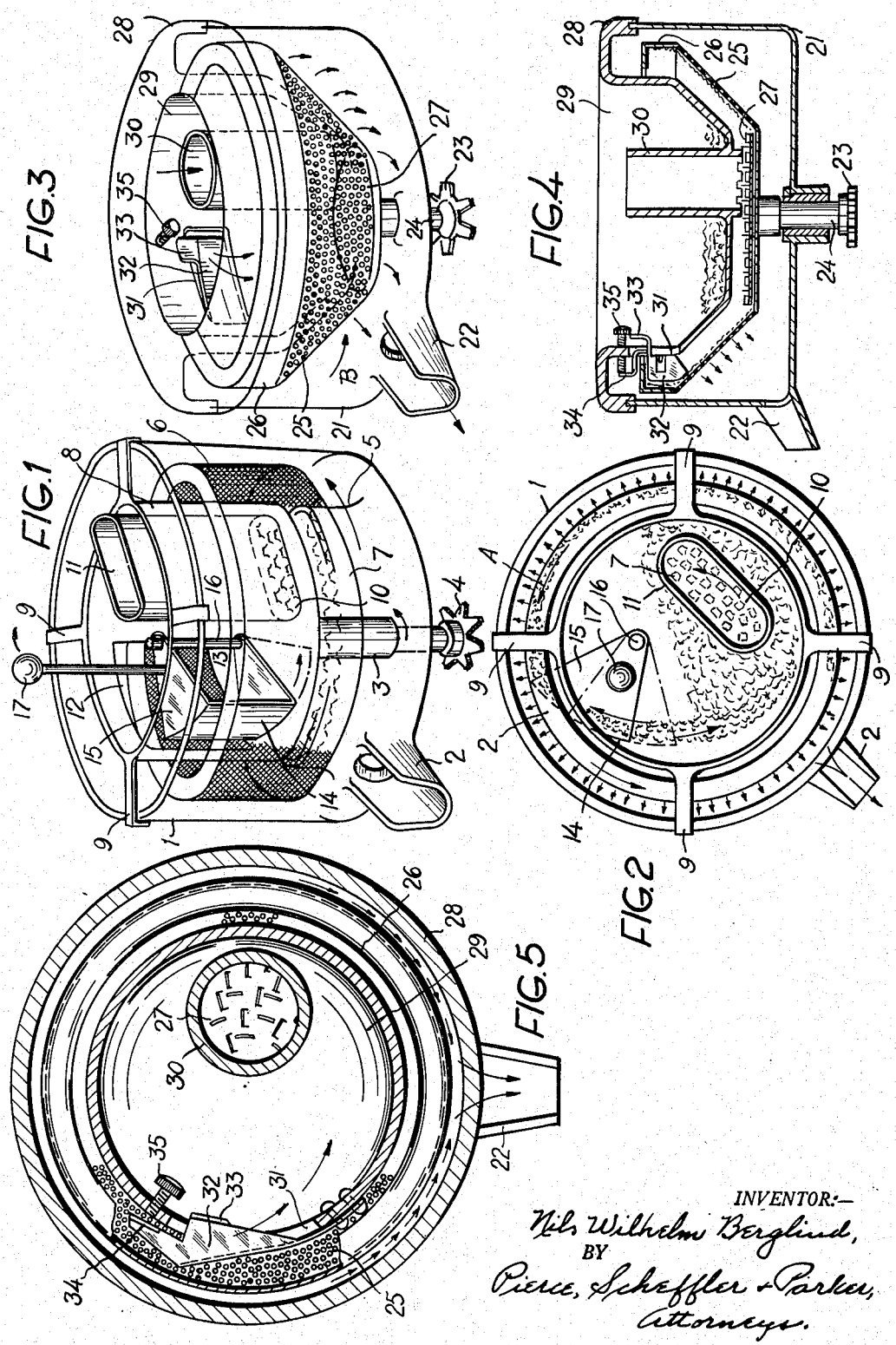

2,660,211

UNITED STATES PATENT OFFICE 2,660,211

CENTRIFUGAL MACHINE FOR THE RECOVERY OF LIQUID OUT OF RAW VEGETABLE FOOD

Nils Wilhelm Berglind, Stureby, Sweden

Application February 13, 1951, Serial No. 210,690

Claims priority, application Sweden February 18, 1950

8 Claims. (Cl. 146—76)

The present invention refers to a centrifugal machine for the recovery of liquid out of raw vegetable food, such as fruits, green vegetables, roots and the like, said raw food being grated on a rotating, substantially plane grater, the grated material being then hurled out by the centrifugal force against a perforated lateral wall arranged at the grater plate and surrounding the same. The liquid contents are separated out of the grated mass through the influence of the centrifugal force and passes through the perforated lateral wall, and is then collected outside the latter in a housing.

In the use of an apparatus of this type, a layer of grated pulp will form by degrees on the perforated lateral wall to a thickness such that liquid hurled out of freshly applied grated pulp will pass through the first layer with difficulty only. It will then be necessary to stop the apparatus, to disassemble the same, and to clean the perforated wall. This makes such apparatus troublesome and time-wasting in use.

The object of the present invention is to obviate said drawbacks and to provide an apparatus capable of running for a sufficient time without having to be stopped for the removal of centrifugated pulp, and wherein the latter may be removed continuously from the perforated wall in the desired quantity.

This is brought about by the feature that the container of the centrifugal machine has a stationary receptacle placed therein, said receptacle being provided with a scraping member adapted to scrape off the centrifugated pulp from the walls of the centrifuge container to convey said pulp into the stationary inner receptacle.

Other features will appear from the following description of a few examples of embodiment according to the invention, reference being had to the accompanying drawings.

In the drawings:

Fig. 1 is a perspective view representing one form of embodiment in Röntgen-fashion, and Fig. 2 shows the same embodiment viewed from above.

Fig. 3 is a perspective view of a further embodiment, which is likewise shown in Röntgen-fashion, and Fig. 4 shows the same embodiment in vertical section. Fig. 5 shows the latter embodiment viewed from above.

The apparatus according to Figs. 1 and 2 consists of an outer stationary housing 1 provided with an outflow spout 2. The apparatus is driven by means of a motor, not shown, which is connected to a disengageable coupling 3 arranged at the end of a shaft 4, which is mounted in the bottom 5 of the housing 1 at the center thereof. The other end of the shaft 4 projecting upwardly within the housing 1 has a rotating dish-shaped strainer 6 concentrically arranged thereon, said strainer being made with a substantially plane, non-perforated bottom and with a cylindrical perforated wall. Arranged in the bottom of the strainer 6 is a plane grater 7, by means of which the row vegetable material is disintegrated. An inner cylindrical, upwardly open receptacle 8 is concentrically suspended in the strainer 6, which latter thus constitutes the container of the centrifugal machine, the suspension of said receptacle being effected by means of four strips 9 folded over the rim of the upwardly open housing 1. The bottom of the inner receptacle 8 is spaced only at a short distance from the grater 7. Provided eccentrically in the bottom of the inner receptacle is an aperture 10 having a feeding-down pipe 11 leading thereto, said pipe extending axially through the whole of the inner receptacle. The feeding-down pipe 11 has for its object to feed down the non-grated raw vegetable material to the grater. Provided in the lateral wall of the inner receptacle is an aperture 12, through which a scraping member, designated in its entirety by 13, is rotatably arranged so as to permit of being moved toward the cylindrical strainer wall. The scraping member 13 is composed of three parts, i. e. of a plate 14 placed at right angles to the bottom of the inner receptacle 8, and two triangular plates 15 parallelling said bottom, which latter plates are each secured by their base edges to the upper and lower edges of the plate 14. The apexes of the plates 15 are pierced, and a bolt 16 is extended through the holes thus obtained down to the bottom of the inner receptacle, where said bolt is preferably screwed fast. The scraping member 13 is thus channel-shaped and swingable about the bolt 16. As will appear from Fig. 2, the fulcrum of the scraping member is arranged, in a direction against the direction of rotation of the centrifugal machine (the arrow A), laterally of the diameter extending from the bearing edge of the scraper toward the strainer and the center of rotation of the apparatus. The scraper is thus incapable of swinging over from the bearing point against the direction of rotation of the centrifugal machine. For the operation of the scraper 13 there is provided a handle 17 extending in an axial direction from the upper plate 15 for a distance outside the inner receptacle.

In the use of the apparatus, the housing 1 is placed with its coupling 4 over a lower structure, not shown, which contains a motor the shaft of which is provided with a coupling fitting into the coupling 4. The motor is started and raw vegetable material, such as fruits, is conveyed in suitable pieces down through the feeding-down pipe 11, and is pressed against the grater 7. The raw vegetable material is thus disintegrated into a fine pulp, which is hurled outwardly by the centrifugal force against the wall of the container 6 of the centrifugal machine, the liquid contained in the vegetable material being thus forced out through the perforated wall, whereupon it is collected within the housing 1, and is caused to flow out through the spout 2. During the operation of the centrifugal machine, the pulp subjected to centrifugation may now be scraped off by means of the scraper 13 and conveyed into the inner receptacle 8, so that the wall of the container of the machine becomes clean and can admit the passage of liquid on continued grating of the raw vegetable material. When the inner container is filled, or the recovery of liquid is terminated, the inner receptacle 8 is simply lifted from the centrifugal machine and emptied. The attendance of the apparatus is thus very simple and convenient.

A further form of embodiment of the invention is shown in Figs. 3, 4 and 5. This embodiment differs from the preceding one substantially in that the container of the centrifugal machine is made with an outwardly inclined perforated lateral wall. The apparatus consists of an outer stationary housing 21 provided with an outflow spout 22. The operation of the apparatus is effected by means of a motor, not shown, in a lower structure, said motor being adapted to be coupled to a coupling 23 arranged at the end of a shaft 24 mounted at the center of the bottom of the housing 21. The other end of the shaft 24 has a rotating centrifuge container 25 secured thereon, said container being made with a plane non-perforated bottom, with outwardly and upwardly inclined walls 25, and with a straight cylindrical, non-perforated portion 26 terminating the strainer at the top. The uppermost rim of the strainer is preferably folded inwardly for a certain distance. Provided in the plane bottom of the centrifugal machine is a plane grater 27 serving to disintegrate the raw vegetable material to be deprived of its juice. Removably arranged on the upper rim of the housing 21 is the folded-down rim 28 of an inner receptacle 29, which follows the configuration of the strainer 25 and is arranged at a distance above the latter, so that a space is provided between the container and the inner receptacle 29 of the machine. Provided in the bottom of the inner receptacle is a feeding-in pipe 30, which is located somewhat laterally of the center line of the grater 27. This feeding-in pipe is extended down through the bottom of the inner receptacle 29, and terminates close to the grater 27. The inner receptacle 29 is at the level of the upper cylindrical portion 26 of the strainer 25 provided with an opening 31 elongated in the peripheral direction, said opening 31 having a scraper 32 resiliently arranged therein. The free portion of the scraper 32 is so arranged in the opening 31 as to meet the strainer in the direction of rotation thereof. Thus, if the strainer rotates in a counter-clockwise direction according to the arrow B in Fig. 3, the free end of the scraper 32 is located on the right in the aperture 31 in said figure. The resiliency of the scraper 32 is such as to counteract an outwardly directed force acting upon the scraper. The scraper 32 is provided with a lug 33 extending inwardly through the aperture 31, by means of which lug the scraper may be operated manually. Another lug of the scraper 32 forms an abutment 34 extending outside the inner cylindrical wall of the inner receptacle. This abutment 34 is intended to cooperate with a stop screw 35 threaded into the inner cylindrical wall of the inner receptacle 29 and serving to adjust the scraper 32 to varying distances from the upper cylindrical portion 26 of the strainer 25.

The apparatus functions in the following manner. The fruits from which the juice is to be extracted is brought down in rather small pieces in the feeding-in pipe 30 to be pressed against the rotating grater plate 27. This plate disintegrates the fruits into a grated pulp which is hurled out by the centrifugal force against the conical perforated wall of the strainer 25, where the enclosed juice is driven off by the centrifugal force and flows down into the housing 21 to escape from the latter through the spout 22. By reason of the conical configuration of the strainer 25 the grated pulp will creep upwardly on the perforated wall while giving off its juice, the pulp then finally reaching the cylindrical portion, where it is collected. The scraper 22 is used here to remove the dewatered grated pulp which is scraped off the cylindrical portion 26 of the strainer 25 and is conveyed through the opening 31 into the inner receptacle 29. Depending on the position of the scraper 32 in the opening 31, that is to say on the distance thereof from the cylindrical portion 26 of the strainer 25, more or less grated pulp will lie collected in the cylindrical portion, and will consequently, more or less, brake the grated pulp creeping upwardly along the strainer. By adjusting the scraper 32 with the aid of a stop screw 35, the time of centrifugation of the strainer may be controlled, which is highly desirable, inasmuch as vegetables of varying kinds require shorter or longer centrifugations. By means of the lug 33 the scraper 32 may be moved as far as to the cylindrical portion 26 of the rotating strainer to relieve this portion of collected grated pulp, for instance when a grating operation is terminated and the centrifugal machine is to be relieved of the grated pulp.

The means above described and shown in the drawings only constitute different examples of embodiment according to the invention, which may be varied in its construction and details, without the inventive idea being departed from. It is thus conceivable to make the conical centrifuge without any terminating cylindrical portion, but with a scraper operating on the conical wall, the wall at the scraper being then non-perforated, if desired. Also, it is not necessary to make the scraper adjustable, it being possible to arrange the same rigidly in the opening of the inner receptacle facing the strainer at a predetermined properly adapted distance from the latter. It is also possible to make the inner receptacle eccentrically rotatable relatively to the container of the machine with a stationary scraper arranged in an opening facing the strainer, the scraper permitting of being approached to or removed from the strainer as desired by a rotary movement of the inner receptacle. It has also proved suitable to make the conical strainer with a steplike, inwardly directed shoulder, before the conical strainer merges into the non-perforated cylindrical portion 26. This shoulder, which should be made of different heights for varying numbers of revolution of the motor, has for its object to brake and raise the pulp subjected to centrifugation, when said pulp comes wandering upwardly along the strainer wall, said shoulder thus having a controlling effect on the centrifugation.

What I claim is:

1. A centrifugal machine for recovering liquid out of raw vegetable food such as fruits, green vegetables, roots and the like comprising in combination, an outer stationary housing having an outlet for discharging liquid, a centrifuge container rotatably mounted in said housing, the bottom of said container being provided with a grating surface and the side wall thereof being perforated for passage of liquid only therethrough, a receptacle for pulp disposed interiorly of said centrifuge container, said pulp receptacle having an aperture through the side wall thereof for admitting pulp and being also provided with a pipe extending through the bottom wall thereof adjacent said grating surface through which food is passed to said surface for grating, and a scraper member carried by said receptacle, said scraper member being disposed at the aperture in the side wall of said receptacle and cooperative with the interior surface of said centrifuge container to remove and lead centrifuged pulp into said receptacle during rotation of said centrifuge container.

2. A centrifugal machine as defined in claim 1 wherein said scraper member is pivotally mounted within said pulp receptacle for movement through the side wall aperture selectively to and away from the interior surface of said centrifuge container.

3. A centrifugal machine as defined in claim 1 wherein the side wall of said centrifuge container extends outwardly and upwardly, and said scraper member and side wall aperture in said pulp receptacle are disposed adjacent the upper edge of said container.

4. A centrifugal machine as defined in claim 1 wherein the side wall of said centrifuge container extends outwardly and upwardly terminating in an imperforate cylindrical edge portion and said scraper member and side wall aperture in said pulp receptacle are disposed adjacent said cylindrical edge portion.

5. A centrifugal machine as defined in claim 1 wherein the side wall of said centrifuge container extends outwardly and upwardly, said side wall aperture in said pulp receptacle is located adjacent the upper edge of said container and said scraper member is constituted by a tongue resiliently mounted on said pulp receptacle.

6. A centrifugal machine as defined in claim 5 and which further includes adjustable stop means cooperative with said resiliently mounted scraper tongue for adjusting the distance between the scraping edge of the tongue and the surface of said centrifuge container.

7. A centrifugal machine as defined in claim 1 wherein the upper edge of said centrifuge container is provided with an inwardly extending peripheral flange to prevent escape of pulp into said outer receptacle.

8. A centrifugal machine as defined in claim 1 wherein said pulp receptacle is supported by and readily detachable from said outer housing.

NILS WILHELM BERGLIND.

References Cited in the file of this patent
UNITED STATES PATENTS

| Number | Name | Date |
|---|---|---|
| 1,271,112 | Anderson | July 2, 1918 |
| 1,761,593 | Sharples | June 3, 1930 |
| 2,180,877 | Lorenzen | Nov. 21, 1939 |
| 2,206,204 | Richli | July 2, 1940 |
| 2,311,379 | Gillanders | Feb. 16, 1943 |
| 2,343,327 | Reynolds | Mar. 7, 1944 |
| 2,513,519 | Reynolds | July 4, 1950 |
| 2,548,417 | Baxter, Jr. | Apr. 10, 1951 |